May 13, 1958 A. L. NIELSEN 2,834,845
SUMP PUMP CONTROL
Filed March 12, 1956 2 Sheets-Sheet 1
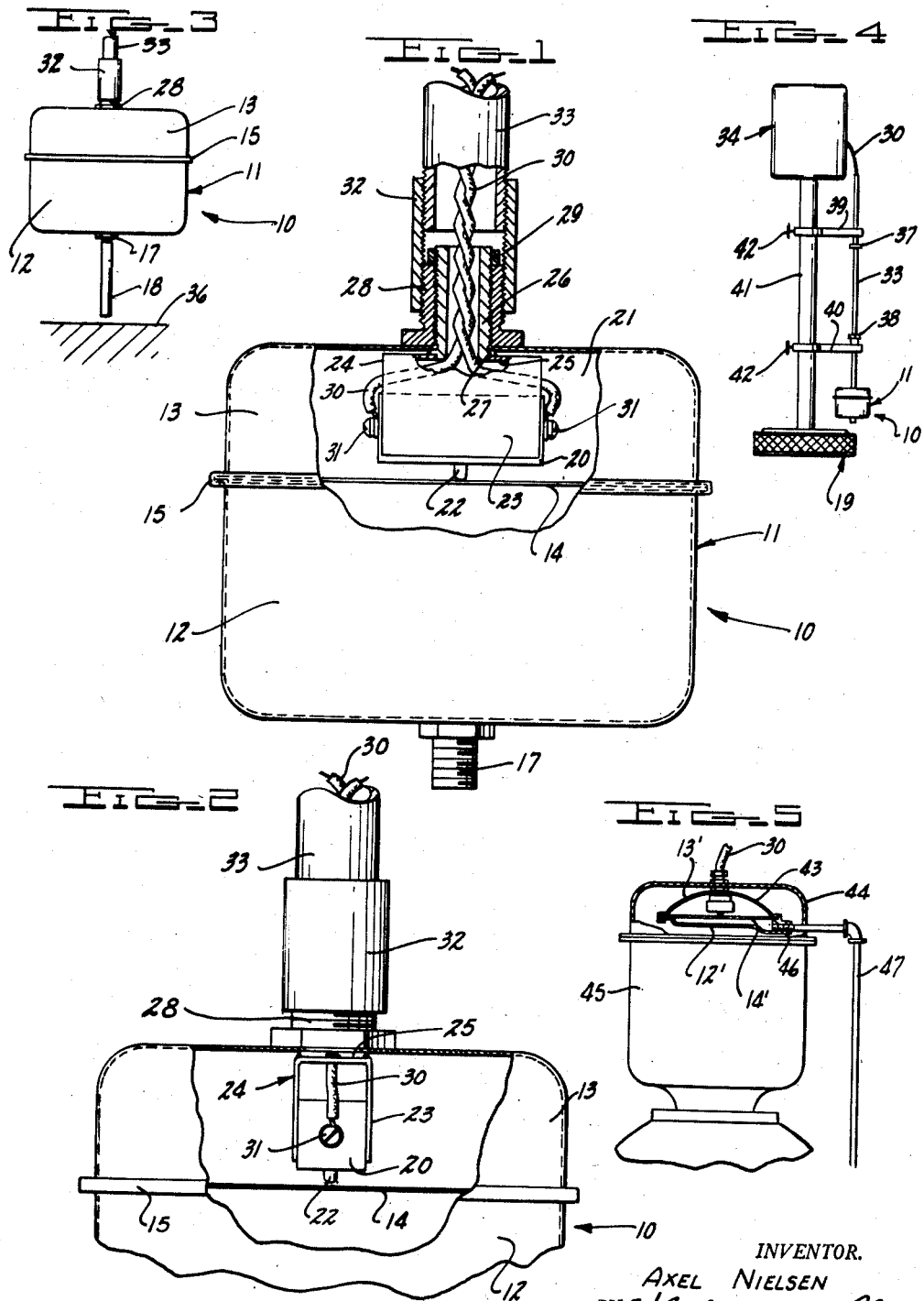
INVENTOR.
AXEL NIELSEN
BY Whittemore, Hulbert &
Belknap
ATTORNEYS

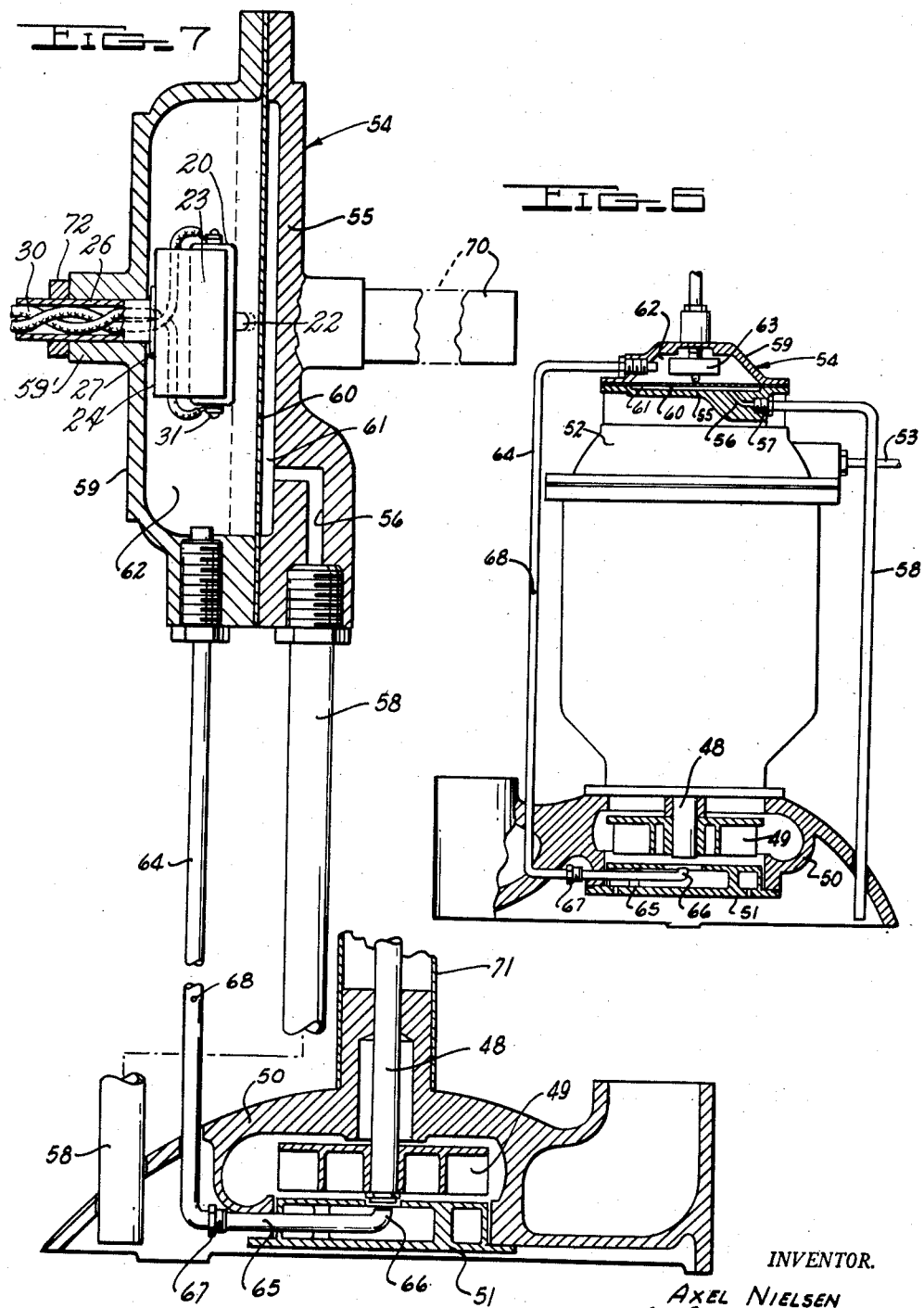

United States Patent Office 2,834,845
Patented May 13, 1958

2,834,845

SUMP PUMP CONTROL

Axel L. Nielsen, Hazel Park, Mich.

Application March 12, 1956, Serial No. 570,730

5 Claims. (Cl. 200—81.5)

The present invention relates to an improvement in an electrically operated sump pump or like pump in which the driving motor for the pump may be reliably controlled, as to commencement and termination of its operation in accordance with the rise and fall of liquid in the sump, in a minimum number of operating cycles.

It is a general object of the invention to provide a control for such a pump driving motor, which embodies a switch and a flexible diaphragm to control the making and breaking of the motor circuit at the switch, with a desired time lag between the commencement of a rise or fall of the sump's liquid level and the actual actuation of the switch to "make" or "break" condition, respectively. The diaphragm constitutes a top wall of an air-liquid pressure chamber opening downwardly to the sump, which chamber is pneumatically pressurized through the opening in proportion to the height of the liquid level to be controlled as the liquid enters the chamber. The diaphragm and switch are selected and related so as to have contact over a substantial range of pressures in the pressure chamber, during the time lag mentioned, prior to actuation of the control button of the switch from "closed" to "open" position, and vice versa. This minimizes the number of operating cycles required of the pump motor over an extended period in limiting the rise of the liquid in the sump above a predetermined critical height.

In accordance with another object, and as a modified adaptation of the invention, the pressure chamber of the control device is provided with an elongated intake tube in communication therewith at its pressure opening, the tube extending into the sump so that the rise of the liquid therein is attended by a rising column within the tube. This effects a slow and gradual initial compression of air in the pressure chamber, expedited when the liquid enters the chamber, and a resultant flexure of the diaphragm to actuate the switch after the desired time delay. An increased range of lag is made possible by this feature.

It is a specific object of the invention to provide a control device including a well sealed casing which is subdivided by the flexible diaphragm to define a pressure chamber on one side of the latter, the chamber being subject to pressurization in proportion to the level of the sump liquid to be controlled; and in which the casing has an upper, atmospheric pressure chamber in which the switch is mounted in an improved manner. In accordance with the principles of the invention as shown, an elongated upper tubular extension opens downwardly into the atmospheric pressure chamber, through which tubular member atmospheric air is admitted. The tubular extension also serves as a shield through which the wiring leads of the switch are brought adjacent and connected to the driving motor for the submerged impeller of the pump.

It is an advantageous feature of the invention that the control device may be employed as a float unit directly buoyed by the liquid in the sump, or as a rigidly mounted control casing communicated with the sump liquid through a downward pressure intake tube of the type referred to above. Thus, in accordance with an object of one illustrated embodiment of the invention, the device may be rigidly sustained, as by a connection to its downward tube extension, above the pump impeller sump or pit, or otherwise appropriately held against axial movement; while in accordance with another embodiment the casing of the control device, as buoyantly sustained by the sump liquid, has its vertical movement in response to a rise or drop of the liquid level positively limited by spaced stops to determine the levels at which the actual pressure responsive control action is initiated and terminated.

In accordance with a still further embodiment of the invention, it is an object to provide a structure in which the switch and diaphragm housing of the control device is mounted directly within the elevated housing for the impeller motor. In an installation of this sort, the pressure chamber is communicated with the liquid by an elongated extension tube, and the device of course operates as a fixed unit.

In accordance with another adaptation, it is an object of the invention to provide a motor control as described which may be optionally rendered responsive, on the side of its diaphragm opposite its variable pressure chamber, to the pump impeller intake. Thus the diaphragm may be subjected to pump intake vacuum until the sump is practically dried, the vacuum line maintaining the diaphragm in switch closing position until such time.

In line with a further object, the pressure transmitting and vacuum lines or tubes are predeterminedly proportioned as to size in inverse ratio to the volumetric capacity of the pressure and vacuum chambers with which they communicate, thereby afford a further factor governing the duration of the switch closing action of the diaphragm.

The foregoing as well as other objects of the invention will become more apparent as this description proceeds, especially when considered in connection with the accompanying drawings, wherein:

Fig. 1 is a fragmentary view, in side elevation, partially broken away and in axial section, illustrating structural details of the improved control device;

Fig. 2 is a fragmentary end elevational view of the device, partially broken away;

Fig. 3 is a fragmentary view showing a modification of the improved device, which is equipped with a pressure tube extension and employed as a fixedly mounted unit;

Fig. 4 is a more or less schematic view in elevation showing the control device in an installation in which the casing of the device acts as a float having positively limited vertical movement;

Fig. 5 is a fragmentary view in elevation, partially broken away and in section, showing the device as embodied directly in a pump motor housing;

Fig. 6 is an elevational view, partially broken away and in vertical section, of a further modification which embodies an optional vacuum control feature to prolong the duration of a pumping cycle; and Fig. 7 is a fragmentary view, also in vertical section, of a further modfiication as to the structural features of the combination of Fig. 6.

Referring to Figs. 1 and 2, the improved control device for a sump pump or the like is generally designated 10. It comprises a well sealed housing or casing 11 of non-corrosive material made up of a lower cup-like shell member 12 of substantial internal volume and an upper inverted cup member 13. A flexible diaphragm 14, which may be of thin spring brass material, extends across the entire horizontal or transverse area of the casing 11, being clamped and well sealed marginally at 15 between adjacent registering marginal edges of the casing members 12, 13.

The diaphragm 14 serves as an upper flexible wall of a pressure chamber defined by the diaphragm and the lower casing member 12; and the bottom of the latter is centrally apertured to receive a threaded tubular pressure intake nipple or fitting 17. An elongated pressure tube or tubular extension 18 (as shown in Fig. 3) may thus be threaded on the fitting 17 in air tight relation thereto in the adaptation shown in Fig. 3, to be described. As employed in the form shown in Figs. 1 and 2 (and also in Fig. 4) the casing 11 floats in liquid in the usual sump in which the pump's impeller housing (designated 19 in Fig. 4) is positioned.

An appropriate control switch 20 is mounted within the upper space or chamber 21 within the casing member 13, which space is kept at atmospheric pressure by provisions to be described. Switch 20 is a suitable enclosed, normally open type having a control button 22 positioned directly above the center of the diaphragm 14. The button may be spring urged or the switch may be a reversible snap acting one, but in accordance with the invention, the switch is one in which the button 22, upon engagement by the upwardly flexing diaphragm 14, will be actuated to close an electrical circuit only when a substantial upward force of, say, 20 oz., is exerted on control button 22. Likewise, the switch 20 is chosen so that when this force drops to, say, 3 oz., the switch will return to its normally open condition. This, it will be seen, permits a dwell, delay or lag range of pressures in the pressure chamber below the diaphragm to be built up or diminish between the instants in which the switch 20 is closed and opened, or vice versa.

The switch 20 is appropriately secured between the plate-like arms 23 of an inverted U-shaped mounting bracket 24, which may be in the form of a shaped brass strip, and the upper cross piece 25 of the mounting bracket 24 is secured, as by soldering, to the lower extremity of a tubular mounting fitting 26 coaxially aligned with the switch control button, as indicated in Figs. 1 and 2, which fitting has a bottom shoulder 27 bearing upwardly against the top panel of upper casing member 13 through which fitting 26 extends. It is to the shoulder 27 that the bracket 24 is secured.

A flanged clamp nut 28 is threadedly engaged with the exterior of tubular fitting 26 and bears against the upper surface of casing member 13 to hold the fitting and mounting bracket 24 rigidly in place; and a lock nut 29 is threaded on the fitting over the nut 28.

Conventional wiring leads 30 are applied to switch terminals 31 and are brought inwardly of the U-shaped bracket 24, and upwardly through fitting 26, whence they are lead through an external coupling 32 threaded on the sleeve 28 and a vertically extending, elongated tube 33 threaded into the coupling 32. Tube 33 shields the leads to their electrical connection with the motor of the installation (shown in Fig. 4 and generally designated 34), and the upper end of the tube 33 is left open, so as to communicate the switch chamber 21 above diaphragm 14 with atmosphere.

In operation, with the diaphragm 14 spaced slightly below the switch control button 22, as shown in Figs. 1 and 2, the switch is open and the motor 34 is de-energized. The casing 11 floats in the liquid in the sump or pit, and as the liquid rises therein it increasingly compresses air in the pressure chamber in member 12, tending to cause diaphragm 14 to flex upwardly into engagement with button 22.

The switch 20 remains in its normally open condition well after force is initially applied to the control button by the diaphragm and exceeds its lower operating limit, i. e., 3 oz. Upon continued rise of the liquid, which may be over a considerable differential in level, the chamber 16 is of course increasingly and substantially proportionately pressurized, so that when the upper critical force on button 22, instanced as 20 oz., is exceeded, the switch 20 closes. The motor 34 is energized to drive an impeller (not shown) in impeller housing 19 to drop the sump liquid level. The motor operates throughout a period determined by the diminishing pressurization of the chamber in member 12, until the lower critical force on button 22 is passed, whereupon the switch opens.

It is seen from the foregoing that the invention provides a motor control of considerable sensitivity which reliably operates to initiate and terminate motor operation in a minimum number of cycles of switching operation. Motor life is extended and noise annoyance minimized, without sacrifice in any degree of desired reliability.

Fig. 3 of the drawings illustrates a fixed installation of the improved device 10 similar in all respects to the construction shown in Figs. 1 and 2, with the addition of the elongated, downwardly extending pressure intake tube 18 to its threaded intake fitting 17. Accordingly, corresponding reference numerals are employed. Here, the casing 11 is rigidly sustained, as by fixedly clamping its intake tube 18 with its lower open end directly above a concrete floored sump 36, in which the pump impeller (not shown) is also located, in the conventional way.

As mentioned, the use of the intake tube extends the duration of time lag between switch actuations. The column of liquid rising in the tubular member 18 with the rise of the level in the pit will gradually compress air in the pressure chamber 16 until the liquid actually enters the chamber, when the compression increases in rate with ultimate transmission of force by the diaphragm 14 adequate to actuate the switch 20.

Fig. 4 of the drawings illustrates an alternative installation in which the casing 11 of the control is buoyed by liquid in the sump for limited vertical travel. For this purpose, upper and lower stop collars 37, 38 are fixed on the upper tube extension 33 in longitudinally spaced relation to one another. Upper and lower guide and stop brackets 39, 40, respectively, are also fixedly clamped onto the usual elongated shaft housing 41 of the sump pump, within which the motor to impeller shaft (not shown) operates. The open upper end of the tube 33 extends well above the upper guide and stop member or bracket 39.

In the operation of the adaptation shown in Fig. 4, the brackets 39, 40 slidingly guide the tubular extension 33 as the floated casing 11 rises and falls, as buoyed in the sump. When in the position shown, the stop collar 38 rests on bracket 40 to prevent further downward movement of the casing, whereupon the switch 20 therein will be opened when the pressure in its chamber in member 12 becomes insufficient to hold the switch closed. Upon a rise of the liquid level, the casing 11 is buoyed upward until the stop 37 on tube 33 engages upper guide bracket 39, whereupon increasing pressurization of the chamber in member 12 occasions a closing of the switch 20 when the upper critical diaphragm force exerted on switch button 22 is exceeded.

The guide and clamp brackets 39, 40 embody adjustable provisions at 42 to enable their axial or vertical spacing to be altered as desired, to thereby alter the vertical distance over which the casing 11 is freely buoyed between operations of its pressured-responsive provisions.

In the further modified embodiment of the invention shown in Fig. 5, structural details of the casing of the control device, here specially designated 43, are altered, inasmuch as the casing is mounted directly within an upper extension dome portion 44 of the usual motor housing 45. Although alterations of the shape of the casing parts are required, the operation is the same. Accordingly, the reference numeral 13' is employed to designate an upper casing member corresponding to the casing member 13, but of mildly domed shape; the reference numeral 12' is employed to designate a lower casing member corresponding to casing member 12, but of considerably reduced internal volume; and the reference numeral 14' designates a flexible diaphragm marginally clamped between the casing members 12′, 13′. It is contemplated that the diaphragm 14′ may be of a non-metallic material, such as neoprene or equivalent corrosion resistant, non-contaminable flexible material. It coacts with a switch 20 mounted to the upper casing member 13′ by provisions which may be similar to those shown in Figs. 1 and 2. The casing 43 is in turn supported on the motor dome 44 by appropriate tubular clamp provisions, and the electrical leads 30 brought from switch 20 through these provisions are connected with a motor housing 45 in a conventional way.

The lower pressure casing member 12′ has an integral extension 46 into which is tapped a pressure tube or conduit 47 extending down into the pump sump, and the operation of the unit as installed in the embodiment of Fig. 5 is identical with the operation described in the other embodiments, lacking, of course, the float features referred to in connection with Fig. 4.

The invention also contemplates the provision of supplemental means to increase the duration of a pumping cycle until the sump level is dropped to the intake of the pump impeller housing, thereby virtually drying the sump; and provisions of this character are shown in Figs. 6 and 7 of the drawings. To some extent the arrangements of Figs. 6 and 7 in this regard are improvements on the sump pump control shown and described in my Patent 2,730,591 of January 10, 1956. They differ therefrom in that the diaphragm of the patented device is primarily actuated positively by a mechanical float connection supplemented by a differential fluid pressure action.

As illustrated in Fig. 6 of the drawings, a motor housing is shown, with a motor driven shaft 48 projecting downwardly therefrom and secured to a pump impeller 49 in an impeller housing 50 secured to the motor housing. A conventional intake trap 51 is associated beneath the pump impeller housing.

A top dome or bonnet 52 of the motor housing receives the electrical motor leads 53, and an individually sealed diaphragm casing 54 is secured on the top of the bonnet 52 in an appropriate fashion.

The casing 54 is constituted by a bottom casing member 55 providing a lateral pressure passage 56 from beneath the same, which threadedly receives a fitting 57 in communication with this passage. Ftting 57 communicates downwardly through a pressure tube 58 of relatively large internal bore size with the sump, at a level beneath the trap 51. The second casing member 59 is bell-like in outline, and a flexible sheet brass diaphragm 60 is marginally clamped between the casing members 55, 59. It will be noted that the diaphragm coacts with member 55 in defining a pressure control chamber 61 of relatively small volumetric capacity as compared with a vacuum or control chamber 62 constituted between the upper casing member 59 and diaphragm 60.

The motor control switch 63 (similar to the switch 20) is appropriately mounted in chamber 62 by similar provisions, and a vacuum line 64 extends laterally from the control chamber 62 and downwardly, where it is brought laterally into communication with the intake side of the impeller housing 50. If desired, this communication may be effected by means of a short horizontal tube length 65 extending into the trap 51 and provided with an upturned end 66 coaxial with the intake eye of the impeller housing. A releasable coupling 67 connects the tube length 65 with the vacuum line 64 outwardly of the trap 51.

The vacuum tube or line 64 is chosen of substantially less internal bore size than the pressure tube 58. Likewise, a small bleeder port 68 may be provided in the line 64 at an intermediate elevation thereof.

It is evident that as the level of liquid rises predeterminedly in the pressure and vacuum lines 58, 64, the respective pressure and vacuum chambers 61, 62 will be increasingly pressurized, although not in corresponding ratio. For example, if the larger and smaller bore lines 58 and 64 are of, say ⅜″ and ¼″ tubing, respectively, an identical rise of liquid therein will (in the absence of bleeder port 68) give rise to a pressure reading in chamber 61 of 6½ oz. per square inch, as compared with a reading of 3 oz. per square inch in the upper control chamber 62. It is evident that the responsivity of the flexible diaphragm 60 in upward flexure, to a given liquid rise, is therefore considerably greater than in the opposite direction.

Assuming that the diaphragm 60 has caused the actuation of the button of switch 63 from the solid line position to the dotted line position of Fig. 6, with such increasing imposition of force on the button as to cause switch 63 to close, the pump motor operates impeller 49 and the liquid level falls accordingly, the upper chamber 62 being subject to the suction at the intake of the impeller. Prior to this, the upper chamber 62 of the control has been pressurized only upon a rise of the liquid level above the small port 68 in line 64.

As the liquid level falls a partial pressure or vacuum condition becomes effective in upper chamber 62, which is not materially affected by the small bleeder aperture 68 and this vacuum causes the diaphragm 60 to be held in closing relation to the switch 63. The vacuum is not reduced sufficiently to enable the diaphragm 60 to move away from the switch button and permit the switch to open until the level has dropped beneath the intake, or impeller eye, end of the vacuum line 64. When this occurs, the vacuum in chamber 62 is immediately broken.

The provision of the auxiliary vacuum line 64 is thus seen to constitute a simple and convenient means to materially lengthen the operating cycle of the motor and thus practically dry out the sump before the motor cycle terminates. The optional positioning of the small aperture 68 permits a desired variation in the differential pressurizing of the diaphragm 60 on its opposite sides; and the inverse size proportioning of the larger upper chamber 62 and smaller vacuum line 64 in relation to the smaller pressure chamber 61 and the larger pressure line 58 affords a further means of timing the installation as to the institution and termination of motor operation.

Fig. 7 of the drawings depicts a further modification which differs from that of Fig. 6 only in regard to its structural arrangement, being operationally identical. Accordingly, corresponding reference numerals are employed to designate corresponding parts. It may be noted that the diaphragm housing or casing is here designed for disposition externally and to one side of the motor housing, rather than in top juxtaposition to the latter as in Fig. 6. To this end, a spring clip 70 is affixed to the casing and snaps onto the usual shaft housing 71 which connects the drive motor to the impeller.

As illustrated in Fig. 7, a switch and mounting provisions therefor similar to what is shown in Figs. 1 and 2 are employed, and accordingly corresponding reference numerals are employed in Fig. 7 to designate corresponding switch and mounting provisions. However, in this case the tubular mounting fitting 26 is threadedly engaged in an integral outer boss or extension 59′ of the casing member 59, coaxially of the switch operating or control element 22, and the lock nut 29 is applied to fitting member 26. The wiring leads 30 for the switch are brought out through the element 26.

Thus, the switch 20, as mounted directly to the casing member 59, may be adjustably positioned in relation to the diaphragm 60 to permit an adjustment of the operating times of the switch, in accordance with its degree of propinquity to the diaphragm. The adjustment is easily and quickly made, without disturbing the axial relationship of the control element 22 to the diaphragm. It is seen that the mounting provisions are threefold in their effect, i. e., as a mount, as an adusting means, and as a conduit for the electrical wiring.

What I claim as my invention is:

1. A pump motor control of the class described, comprising the combination of means including a flexible diaphragm defining a sealed liquid receiving pressure chamber having a pressure opening to its exterior through which the chamber is variably pressurized, and electrical control means actuated by said diaphragm to open and close an electrical control circuit in response to the flexure of the diaphragm under differing pressure in said chamber, said control means and diaphragm having means operatively connecting the same to open and close said circuit only at the limits of a substantial range of pressures in said chamber, said first named means including a sealed control chamber on the side of said diaphragm opposite said pressure chamber, and a hollow vacuum line communicating said control chamber with the intake side of a pump powered by the controlled motor.

2. A pump motor control of the class described, comprising the combination of means including a flexible diaphragm defining a sealed liquid receiving pressure chamber having a pressure opening to its exterior through which the chamber is variably pressurized, and electrical control means actuated by said diaphragm to open and close an electrical control circuit in response to the flexure of the diaphragm under differing pressure in said chamber, said control means and diaphragm having operative engagement to open and close said circuit only at the limits of a substantial range of pressures in said chamber, said first named means including a sealed control chamber on the side of said diaphragm opposite said pressure chamber, and a hollow vacuum line communicating said control chamber with the intake side of a pump powered by the controlled motor.

3. A pump motor control of the class described, comprising the combination of means including a flexible diaphragm defining a sealed liquid receiving pressure chamber having a pressure opening to its exterior through which the chamber is variably pressurized, and electrical control means actuated by said diaphragm to open and close an electrical control circuit in response to the flexure of the diaphragm under differing pressure in said chamber, said control means and diaphragm having operative engagement to open and close said circuit only at the limits of a substantial range of pressures in said chamber, said first named means including a sealed control chamber on the side of said diaphragm opposite said pressure chamber, and a hollow vacuum line communicating said control chamber with the intake side of a pump powered by the controlled motor, said pressure opening and the bore of said vacuum line being inversely proportioned as to size in relation to the respective volumes of said pressure and control chambers.

4. A pump motor control of the class described, comprising the combination of means including a flexible diaphragm defining a sealed liquid receiving pressure chamber having a pressure opening to its exterior through which the chamber is variably pressurized, and electrical control means actuated by said diaphragm to open and close an electrical control circuit in response to the flexure of the diaphragm under differing pressure in said chamber, said control means and diaphragm having operative engagement to open and close said circuit only at the limits of a substantial range of pressures in said chamber, said first named means including a sealed control chamber on the side of said diaphragm opposite said pressure chamber, and a hollow vacuum line communicating said control chamber with the intake side of a pump powered by the controlled motor, said vacuum line being provided with a bleeder opening intermediate the ends thereof.

5. A pump motor control of the class described, comprising the combination of means including a flexible diaphragm defining a sealed liquid receiving pressure chamber having a pressure opening to its exterior through which the chamber is variably pressurized, and electrical control means actuated by said diaphragm to open and close an electrical control circuit in response to the flexure of the diaphragm under differing pressure in said chamber, said control means and diaphragm having operative engagement to open and close said circuit only at the limits of a substantial range of pressures in said chamber, said first named means including a sealed control chamber on the side of said diaphragm opposite said pressure chamber, and a hollow vacuum line communicating said control chamber with the intake side of a pump powered by the controlled motor, said pressure opening and the bore of said vacuum line being inversely proportioned as to size in relation to the respective volumes of said pressure and control chambers, said vacuum line being provided with a bleeder opening intermediate the ends thereof.

References Cited in the file of this patent

UNITED STATES PATENTS

| Number | Name | Date |
|---|---|---|
| 246,718 | Cable | Sept. 6, 1881 |
| 2,305,154 | Gilbert | Dec. 15, 1942 |
| 2,320,121 | Durbin | Mar. 25, 1943 |
| 2,395,657 | Dinsmore et al. | Feb. 26, 1946 |
| 2,421,149 | Segerstad | May 27, 1947 |
| 2,481,612 | Nicholson | Sept. 13, 1949 |
| 2,591,852 | Murray | Apr. 8, 1952 |
| 2,635,546 | Enyeart et al. | Apr. 21, 1953 |
| 2,640,977 | Parisi | June 2, 1953 |
| 2,680,168 | Murphy | June 1, 1954 |
| 2,687,693 | Hudson | Aug. 31, 1954 |